No. 869,483. PATENTED OCT. 29, 1907.
T. L. DENNIS, Jr. & A. C. LINDHOLM.
WORK LOCATING INDICATOR.
APPLICATION FILED APR. 2, 1907.
2 SHEETS—SHEET 1.
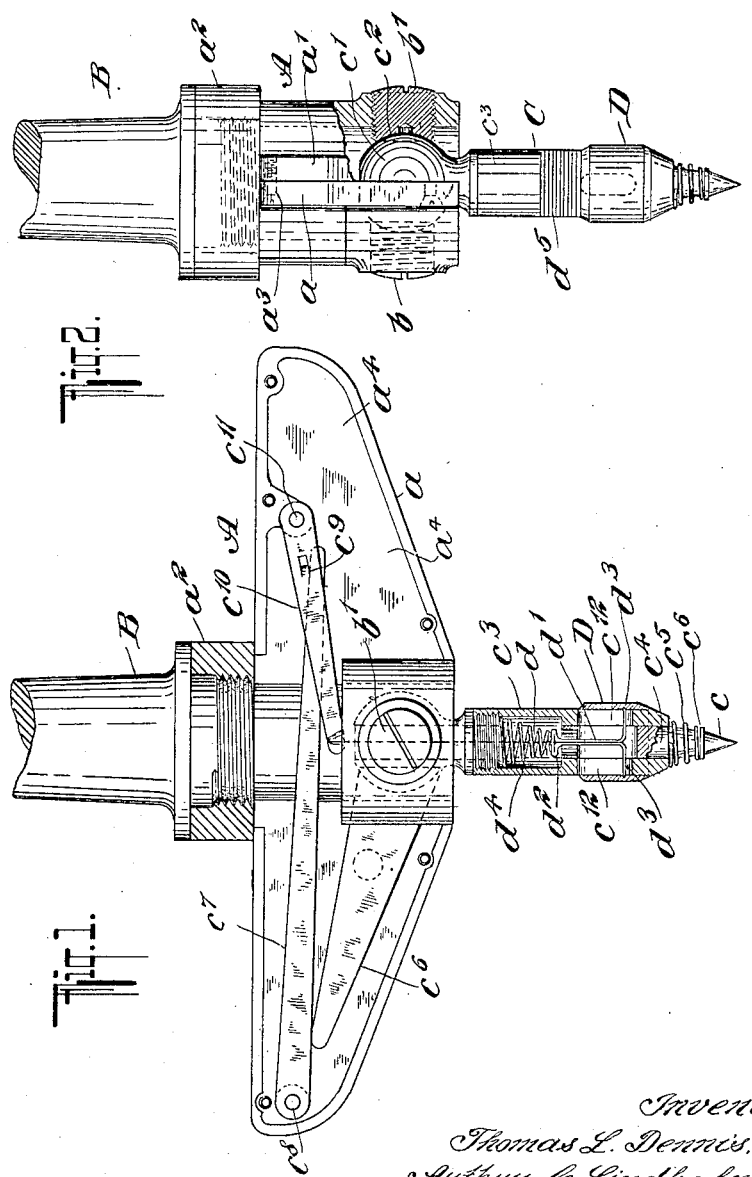
Witnesses.
Julius H. Lutz
Grace T. Lipon
Inventors
Thomas L. Dennis, Jr.,
Arthur C. Lindholm.
By Wm H. Appleton
Attorney No. 869,483.
PATENTED OCT. 29, 1907.
T. L. DENNIS, Jr. & A. C. LINDHOLM.
WORK LOCATING INDICATOR.
APPLICATION FILED APR. 2, 1907.
2 SHEETS—SHEET 2.
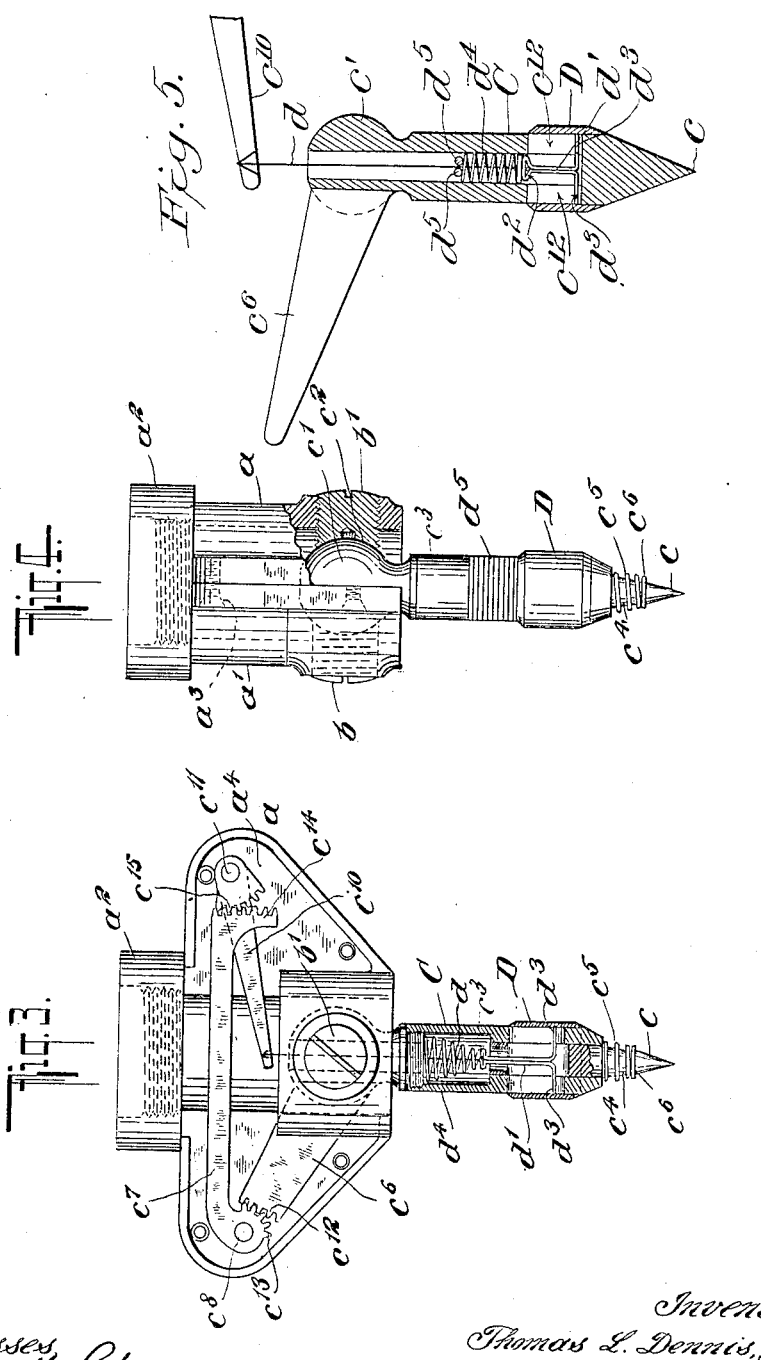

UNITED STATES PATENT OFFICE.

THOMAS L. DENNIS, JR., AND ARTHUR C. LINDHOLM, OF PRINCE BAY, NEW YORK.

WORK-LOCATING INDICATOR.

No. 869,483.      Specification of Letters Patent.      Patented Oct. 29, 1907.

Application filed April 2, 1907. Serial No. 366,004.

*To all whom it may concern:*

Be it known that we, THOMAS L. DENNIS, Jr., and ARTHUR C. LINDHOLM, citizens of the United States, and residents of Prince Bay, in the county of Richmond and State of New York, have jointly invented certain new and useful Improvements in Work-Locating Indicators, of which the following is a specification.

Our invention relates to that class of work locating indicators, which are employed in locating a point, as, for instance, the center of a hole that is to be drilled, or otherwise formed, with respect to a particular axis of rotation. Heretofore in indicators of this general character, a spindle or other slender rod has been supported at a short distance from one of its ends in a stationary rest, as, for instance, a lathe-rest, when employed in connection with a lathe, through the intermediary of a universal joint, and the position of the point to be located has been indicated by pressing the sharpened end of the spindle or rod against it, and then rotating the object of work containing the point, when, if the point was located in the axis of rotation, there would be no motion of the spindle or rod, while, if it was located eccentrically thereto, or out of position the spindle or rod would be so moved that its opposite ends would travel around in an orbital path, thereby, in either case, indicating the location of the point with respect to such axis. These prior indicators, while efficient in practice to a certain degree in indicating the location of a point with respect to a rotating axis, when the point is traveling around with such axis, are wholly useless in locating a point with respect thereto, when the point is stationary.

The objects of our invention are, therefore, to provide an indicator, which shall indicate the location of a point with respect to a rotating axis equally well whether the point is rotated or held stationary, and which shall, at the same time, operate with greater efficiency and accuracy than those heretofore in use.

To these ends, the invention consists in certain peculiarities of construction and combination of parts, the preferred embodiments of which are hereinafter set forth, and the novel features of the invention pointed out in the claims.

Referring to the accompanying drawings, which form a part of this specification, Figure 1, is a side view of an indicator constructed in accordance with our invention, with one of the coinciding parts or members of the frame removed, a portion of the supporting shank broken away, and certain of the parts shown in section; Fig. 2, an edge view of the indicator, with a portion of the frame, and a portion of the supporting shank, broken away; Fig. 3, is a side view, similar to Fig. 1, of the indicator, of a slightly modified construction; Fig. 4, an edge view thereof with certain of the parts broken away, and, Fig. 5, a sectional side elevation of a modified form of construction of certain of the parts of the indicator detached.

In all the figures, like letters of reference are employed to designate corresponding parts.

A designates the frame which supports and carries the operative parts of the indicator, and B designates the means by which it is applied to the various machines in connection with which the indicator may be employed.

The frame A, in its construction, may be modified in various ways, but, in the embodiment which has been selected for purposes of illustration, it is constructed of the form shown in the drawings, and is made up from two coinciding plate-like parts or members $a$ and $a^1$, with one of these parts or members, as for instance, $a$, provided on its upper edge with a hub $a^2$, which is or may be located centrally thereon. As thus made up, these parts or members $a$ and $a^1$ are secured together by screws $a^3$, which pass through the one and engage with suitable threaded orifices formed in the other, and each is provided on its inner side with a shallow recess $a^4$, whereby, when these parts or members are secured together, an inclosed chamber is formed between them.

The means B by which the indicator is applied to the various forms of machine in which it may be employed, will be so fashioned as to suit it to the requirements of each. In the drawings however, they are shown as constructed in the form of a shank, which is adapted to enter the socket in the spindle, of a lathe, of a drill press, or of a milling machine, but this is merely illustrative, and other forms may be employed as the location of use may demand.

C designates the shaft which engages with the point to be located, and, through the movement imparted to it therefrom, indicates, through appropriate devices, the relationship of such point with respect to the desired axis of rotation. This shaft is provided at its outer free end with a pointed extremity $c$, for engaging with the point to be located, and is supported at its opposite end in the frame A, in such a manner as to be capable of an orbital motion therein. The means by which the supporting of this shaft is effected, may be modified in various ways, it only being essential, that, whatever the means, they be such as permit of the movement of the free pointed end of the shaft in all directions laterally with respect to a line passing axially through the shank B. As shown in the drawings, however, they consist of a ball and socket joint, in which the ball $c^1$ is formed upon the end of the shaft, and the socket is constructed in the form of correspondingly shaped recesses $c^2$ in the inner ends of the screws $b$ and $b^1$, that are respectively threaded in suitable orifices formed in the parts or members $a$ and $a^1$ of the frame A. By these means, as will be seen, a free and easy swinging movement of the shaft in all directions laterally is permitted, and provisions made for adjusting the shaft and taking up any wear that may be occasioned at the joint.

In some instances the shaft C will be constructed in one piece, and, in such case, the sharpened point $c$ will be integral therewith as shown, for example, in Fig. 5. We prefer however, to construct it in sections, as illustrated in the remaining figures, and to make the pointed end $c$ separate therefrom, as provision is then made for allowing the pointed end to be made yielding, and to thereby press against the point to be located with a yielding pressure. When thus made, the ball $c^1$ and the part adjacent thereto will constitute one section, and the part $c^3$ thereof between this section and the pointed end will constitute another, which will preferably be constructed of tubular form, and be secured at one of its ends to the section $c^1$ by being screw threaded thereon. As thus constructed, the free end of the shaft C receives a short shaft $c^4$, which is fitted to slide therein, and is constructed with a lower pointed end $c$, held projected outward from the end of the shaft C by a spring $c^5$, which bears at one of its ends against the outer free end of the shaft C, and at its other end against a collar $c^6$ formed upon a shaft $c^4$, as shown, whereby to allow of such pointed end yielding when brought in contact with the point to be located, and of being held against the same by a pressure of that character while in contact therewith.

Formed upon or rigidly secured to the ball $c^1$, and extending outwardly therefrom, is an arm $c^6$, which engages at its free end with a lever $c^7$, that is fulcrumed at one of its ends within the frame A, by a pivot pin $c^8$, and extends across from one end of the frame A to near its other, where it engages with a lug $c^9$, formed upon a lever $c^{10}$, which, in turn, is pivoted within the frame A, by a pivot pin $c^{11}$, and extends inward toward the center of the frame, with its free end located in approximately a line passing axially through the shank B. As thus arranged, any orbital motion that may be imparted to the shaft C, will be communicated to the lever $c^{10}$, through the arm $c^6$ and lever $c^7$; and, in order that the motion imparted thereto may be magnified, the point of contact of the arm $c^6$ with the lever $c^7$ is near the fulcrum $c^8$ of such lever, and the same is true with respect to the point of contact of the free end of the lever $c^7$ with the lever $c^{10}$, which is with the lug $c^9$ near the pivot $c^{11}$ thereof.

With the parts arranged as thus explained, the relationship of the point to be located with respect to the required axis of rotation may be visually indicated in various ways. In the form of the invention which is illustrated in the drawing, however, it is effected by a sleeve-like index D, which is fitted to slide upon the shaft C, and is connected with the free end of the lever $c^{10}$ through appropriate devices, whereby it is caused to travel back and forth longitudinally of the shaft in unison with the movement of the lever $c^7$. The means by which this connection of the sleeve-like index D with the free end of the lever $c^{10}$ is effected, may be of various forms. In the drawings, however, we have shown it as accomplished by a rod $d$, which extends downward through the shaft C, and is connected at its lower end with the index D; to permit of which, the section $c^1$ of the shaft C, as well as the section $c^2$ thereof, is made tubular, and the section $c^3$ is provided with slots $c^{12}$ in its sides, through which the connection of the rod $d$ with the sleeve is effected by the construction of parts shown at $d'$, $d^2$ and $d^3$. As thus connected, as will be seen, any vibratory or orbital motion imparted to the lower end of the shaft C, will, through the arm, levers, and connecting rod, be imparted to the index D, and cause it to move up and down along the shaft C; and in order to move the levers and sleeve in one direction after they have been moved in an opposite direction by the arm $c^6$, we make use of a spring $d^4$, which is interposed within the shaft C, and, acting at one end against the lower extremity of the section $d^1$, and at the other end against the enlargement or head $d^2$ of the supplemental section $d^1$, serves to move those parts in an opposite direction to that imparted to them by the arm $c^6$. While thus the relationship of the point to be located to the required axis of rotation is indicated by the movement of the index D, the extent of this movement, and the degree of eccentricity of the point with respect to the axis of rotation, may be indicated in any appropriate way, as, for instance, by a series of graduations $d^5$, formed upon the shaft C, as shown.

In Figs. 1 and 2 of the drawing we have shown the engagement of the end of the arm $c^6$ with the lever $c^7$, and the engagement of the free end of the lever $c^7$ with the lug $c^9$ of the lever $c^{10}$, as effected by the contact of one with the other. In Figs. 3 and 4, on the other hand, we have shown this engagement as accomplished through the intervention of gear teeth, and, to permit of this, the arm $c^6$ is provided at its free end with a gear segment $c^{12}$, which intermeshes with a corresponding segment $c^{13}$, formed on the lever $c^7$, in concentric relationship to its pivot $c^8$, while the free end of the lever $c^7$ is, in like manner, provided with a gear segment $c^{14}$, which intermeshes with an appropriately formed gear segment $c^{15}$ formed on the lever $c^{10}$ in concentric relationship to its pivot $c^{11}$. By this arrangement, as will be seen, the movements of the levers and the other parts operated therefrom, are made positive in both directions, and, with this construction, a spring $d^4$ may be used or dispensed with, as may be preferred. With the parts constructed and organized as illustrated in either of these modifications, the indicator may be employed as has been before explained, to indicate the location of a point with respect to a given axis of rotation, whether the point is moving around that axis or stationary with respect thereto. When, for instance, the point to be located is in motion, as when the object containing it is secured to a rotating face-plate, then the indicator will be held stationary, and the location of the point with respect to the axis of rotation of the face-plate will be indicated by the movement of the index D back and forth along the shaft C, if the point be eccentric thereto, or by its absence of movement if it be coincident therewith. On the other hand, when the point that is to be located is carried by an object that is stationary, as when the object is secured to the bed-plate of a drill-press or milling machine, then the indicator will be rotated, and the location of the point with respect to the axis of rotation of the indicator will be similarly indicated.

When employed to indicate the location of a point carried by the face-plate of a lathe, the shank-like holding means B, may be either inserted in the spindle of the tail-stock, or be fashioned as to be held in the tool-rest. On the contrary, when the indicator is employed to indicate the location of a point carried by the stationary bed, as for instance, that of a milling machine or drill-press, then the shank-like holding means B will be inserted in the rotating spindle thereof, and the indicator will rotate with it.

From the above description therefore, it will be seen, that we provide an indicator, which may be employed either in locating a stationary or moving point with respect to an axis of rotation, and which, while extremely simple in construction, is, at the same time, efficient in operation.

While in the drawings we have shown, and in the foregoing described, the best means contemplated by us for carrying our invention into practice, we wish it distinctly understood that we do not limit ourselves thereto, as it is obvious that they may be modified in various ways without departing from the spirit of the invention.

Having now described our inventon and specified certain of the ways in which it may be carried into effect, we claim and desire to secure by Letters Patent of the United States,—

1. The combination, with a shaft joined at one end to a support and adapted to engage at its other end with a point to be located and capable of an orbital motion, and an index fitted to slide thereon, of connecting mechanism intermediate the shaft and the slidable index, whereby the location of such point with respect to an axis of rotation and the extent of its eccentricity thereto are indicated, substantially as described.

2. The combination, with a frame, a shaft provided with a pointed end and supported at its other end in such frame so as to be capable of an orbital motion at its free end, and an index fitted to slide along such shaft, of connecting mechanism intermediate the shaft and the index whereby the relation of such pointed end with respect to an axis of rotation may be indicated, substantially as described.

3. The combination, with a frame, a shaft supported therein by a ball and socket joint and provided with a pointed free end, and an index adapted to move along the shaft, of connecting mechanism intermediate the shaft and index, whereby the relation of such pointed end with respect to an axis of rotation may be indicated, substantially as described.

4. The combination, with a frame, a shaft supported at one of its ends therein by a ball and socket joint with its opposite end pointed, and a sleeve-like index mounted to slide upon said shaft, of an arm rigidly connected with such shaft, a system of levers operated by such arm, and connecting devices between one of said levers and the sleeve-like index, substantially as described.

5. The combination, with a frame, and means by which it may be applied to the machine in which the indicator may be employed, of a tubular shaft supported at one of its ends in such frame by a ball and socket joint, and carrying at its other end a second shaft having a pointed end, a sleeve-like index mounted to slide upon the first mentioned shaft, an arm carried by the tubular shaft, a lever fulcrumed within the frame and acted upon by said arm, a second lever also pivoted in such frame and acted upon by the first mentioned lever, and a connecting rod intermediate this last mentioned lever and such sleeve-like index, substantially as described.

6. The combination, with a supporting frame provided with means by which it may be applied to the machine in which the apparatus may be employed, and a tubular shaft jointed at one of its ends in such frame by a ball and socket joint, and provided at its other end with a movable shaft that is constructed with a pointed end, of a spring interposed between the two shafts, whereby the said pointed end may be brought in contact with the point to be located and held against it by yielding pressure, substantially as described.

7. The combination, with a supporting frame, a tubular shaft adapted to engage with a point to be located and jointed at one of its ends in such frame by a ball and socket joint, of an arm projecting from this shaft, a sleeve-like index adapted to slide upon such shaft, a lever pivoted in such frame and engaged by such arm, a second lever also mounted in said frame and engaged by the first mentioned lever, a connecting rod intermediate this last mentioned lever and such sleeve-like index, and a retracting spring for returning such parts to their normal positions after having been moved therefrom, substantially as described.

8. The combination, with a supporting frame having a socket formed therein, a shaft provided with a ball for coöperating with such socket and also with a pointed end and graduations, and an index fitted to slide along such shaft and coöperate with the graduations, of mechanism for connecting the said shaft with the index and comprising an arm and a system of levers, substantially as described.

In witness whereof we have hereunto set our hand this 27th day of March, 1907.

THOMAS L. DENNIS, JR.
ARTHUR C. LINDHOLM.

Witnesses:
EDW. A. FISCHER,
WILLIAM N. COLE.